United States Patent
Steinway et al.

(10) Patent No.: US 7,064,701 B2
(45) Date of Patent: *Jun. 20, 2006

(54) CONCEALED OBJECT DETECTION

(75) Inventors: William Steinway, Smyrna, GA (US); Gregory Stilwell, Orlando, FL (US); Herbert Duvoisin, III, Orlando, FL (US); David H. Fine, Lincoln, MA (US)

(73) Assignee: L-3 Communications CyTerra Corporation, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/009,135

(22) Filed: Dec. 13, 2004

(65) Prior Publication Data

US 2005/0099331 A1 May 12, 2005

Related U.S. Application Data

(63) Continuation of application No. 10/241,835, filed on Sep. 12, 2002, now Pat. No. 6,831,590.

(60) Provisional application No. 60/318,327, filed on Sep. 12, 2001.

(51) Int. Cl.
*G01S 13/04* (2006.01)
*G01S 7/41* (2006.01)

(52) U.S. Cl. .............. 342/22; 342/27; 342/42

(58) Field of Classification Search .......... 342/22, 342/27, 42

See application file for complete search history.

(56) References Cited

U.S. PATENT DOCUMENTS

| | | | |
|---|---|---|---|
| 3,707,672 A | 12/1972 | Miller et al. | |
| 3,713,156 A | 1/1973 | Pothier | |
| 4,122,783 A | 10/1978 | Pretini | |
| 4,471,343 A | 9/1984 | Lemelson | |
| 5,081,456 A | 1/1992 | Michiguchi et al. | |
| 5,181,234 A | 1/1993 | Smith | |
| 5,227,800 A | 7/1993 | Huguenin et al. | |
| 5,339,080 A | 8/1994 | Steinway et al. | |
| 5,345,240 A | 9/1994 | Frazier | |
| 5,552,705 A | 9/1996 | Keller | |
| 5,557,283 A | 9/1996 | Sheen et al. | |
| 6,342,696 B1 | 1/2002 | Chadwick | |
| 6,359,582 B1 | 3/2002 | MacAleese et al. | |
| 6,417,797 B1 | 7/2002 | Cousins et al. | |
| 6,469,624 B1 | 10/2002 | Whan et al. | |
| 6,501,414 B1 | 12/2002 | Arndt et al. | |
| 6,650,276 B1 | 11/2003 | Lawless | |
| 6,856,271 B1 * | 2/2005 | Hausner | ............. 342/22 |
| 2002/0008655 A1 | 1/2002 | Haj-Yousef | |
| 2003/0179126 A1 | 9/2003 | Jablonski et al. | |

* cited by examiner

*Primary Examiner*—Thomas H. Tarcza
*Assistant Examiner*—Isam Alsomiri
(74) *Attorney, Agent, or Firm*—Fish & Richardson P.C.

(57) ABSTRACT

A concealed object detection system for detecting objects concealed on a person includes radar transponders that are each configured and positioned to direct a radar signal at a person and to detect a portion of the radar signal reflected by the person. A processor connected to the radar transponders processes the portions of the radar signals detected by the radar transponders to determine whether the person is carrying a concealed object. The system may produce a real-time alert, such as an audible alert, when a concealed object is detected.

15 Claims, 9 Drawing Sheets

CONCEALED OBJECT DETECTION

CROSS-REFERENCE TO RELATED APPLICATIONS

This application is a continuation, and claims the benefit of priority under 35 U.S.C. 120, of U.S. application Ser. No. 10/241,835, filed Sep. 12, 2002 now U.S. Pat. No. 6,831,590 and titled: Concealed Object Detection, which itself claims priority under 35 U.S.C. 119(e) to provisional application No. 60/318,327, filed Sep. 12, 2001, and titled: Concealed Object Detection, both of which are incorporated by reference.

TECHNICAL FIELD

This description relates to detecting concealed objects, such as objects concealed on a person who is entering a secured area.

BACKGROUND

One common approach to detecting concealed objects on a person is to have the person pass through a metal detector.

SUMMARY

Techniques are described for using advanced algorithms developed for buried mine detection to yield a very high probability of detection against concealed objects that can be dangerous or undesirable, coupled with a low false alarm rate. In particular, unique, shallow buried plastic target detection technology that employs radar signals may be applied to aviation security to counteract potential terrorist acts involving smuggling of explosives and other objects on the body.

In one implementation, a concealed object detection system for detecting objects concealed on a person includes radar transceivers that are each configured and positioned to direct a radar signal at a person and to detect a portion of the radar signal reflected by the person. A proceeesor connected to the radar transcevivers processes the portions of the radar signals detected by the radar transceivers to determine whether the person is carrying a concealed object. The system may produce a real-time alert, such as an audible, when a concealed object is detected.

Other features and advantages will be apparent from the following description, including the drawings, and the claims.

DESCRIPTION

Figure 1:
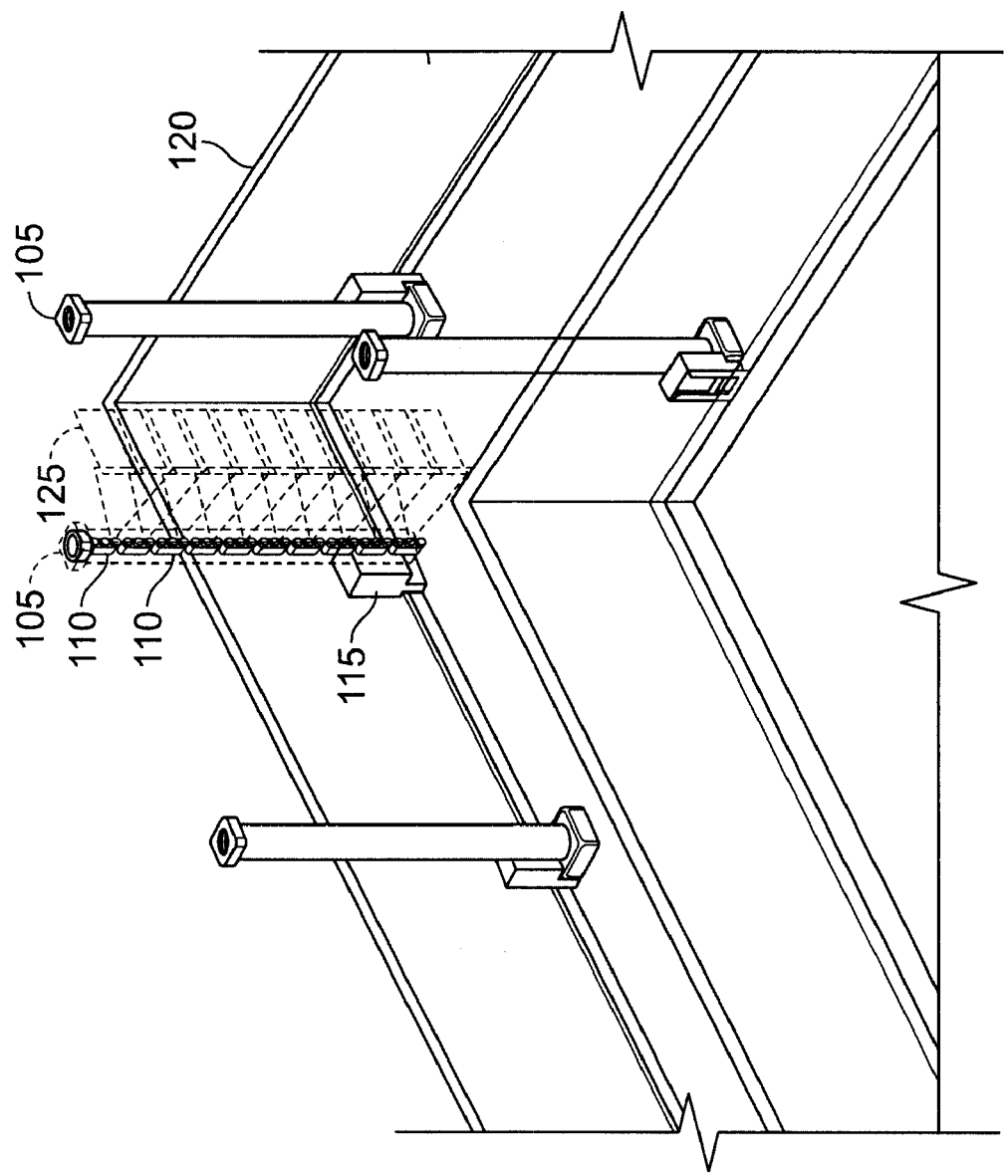
FIG. 1. is a block diagram of a concealed object detection system.

Referring to FIG. 1, a concealed object detection system 100 includes a series of vertical posts 105. Multiple detectors 110 are mounted on each post 105 and are coupled to a signal processing system 115 that processes signals from the detectors 110. The system provides low-cost, real-time, and user-friendly object detection using ultra-low power radar (<$\frac{1}{100}$ specific absorption rate "SAR"). Except for frequency band and system/antenna size, each detector 110 is comparable to a detector used for buried mine detection. In particular, the system 100 may be used to apply shallow buried plastic target detection technology to aviation security and other situations to detect explosives and other objects on the body of a person passing through the system.

The current, advanced algorithms for the detection of buried land mines yield excellent detection (~100%) and very low false alarm rates (~0.1%). This result is achieved over widely varying material types and conditions, and may even be used to detect small, plastic-encased, buried antipersonnel mines. For example, the algorithms may be used to detect small plastic mines that are six centimeters in diameter and nearly one centimeter thick, which typically are buried from flush to the surface to five centimeters below the ground. Larger plastic mines (greater than ten centimeters in diameter) often are buried up to fifteen centimeters deep.

Concealed object detection is technically similar to mine detection. The radar frequency (RF) signal is transmitted from the antenna and the reflected signal energy is detected and processed. The processing methodology determines when the reflected signal appears to be coming from a particular material to be detected (e.g., explosives) and rejects all other reflections. In the case of mines, the algorithms have been very successful in the detection of explosives contained within a plastic housing. In the case of concealed objects on a person, such as explosives that have a form factor of one centimeter of thickness over an extended area of several centimeters in length and width, the detection methodology is similar. The algorithms 'see' the signal reflected from the person in the same way that the mine detection algorithms 'see' the signal reflected from the ground. When the explosives are present, the reflected signal will change. It is this change that is recognized by the algorithms and declared as a detection of the explosive material.

One implementation uses only three detectors 110, each of which is similar to a mine detection device. Measurements are made over a signal bandwidth from 1.5 GHz to 10 GHz. This band is wider and of slightly higher frequency than is normally used for buried mine detection. Because clothing transmits higher frequencies than several inches of soil, investigation of this wider band is desirable to support initial optimization of the parameters for the advanced algorithms. RF energy density is less than one hundredth of standard limits. The key factor determining performance is the application of the advanced algorithms to the measured data.

In the implementation of FIG. 1, it can be seen that ten detectors 110 are arranged vertically from top to bottom within each post 105, and face outward from a wall 120 against which they are mounted. As referred to above, each detector 110 includes an antenna, which may include, for example, a cavity-backed spiral or horn antenna. The beam front 125 shows the approximate coverage and overlap of each antenna send/receive beam against the passenger body. It should be apparent from FIG. 1 and from the description herein that four posts 105 and sets of detectors 110 may be used to cover each side (front, back, and right/left) of a given passenger. The detector(s) 110 may be connected to the electronics box 115 by any conventional means, including, for example, coaxial cable.

Figure 2:
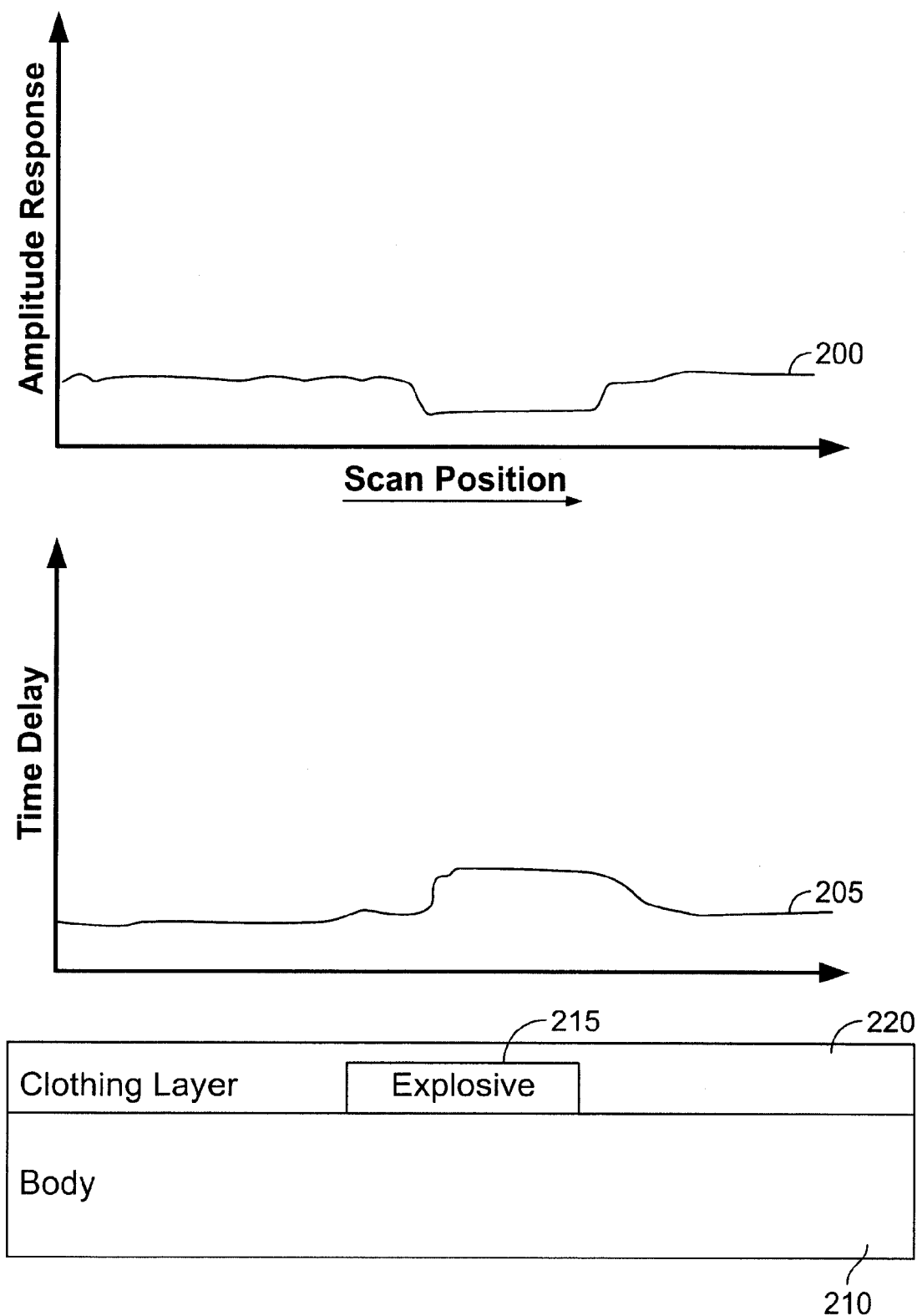
FIG. 2 is a graph showing a reflected radar signal in relation to a concealed object.
Figure 3A:
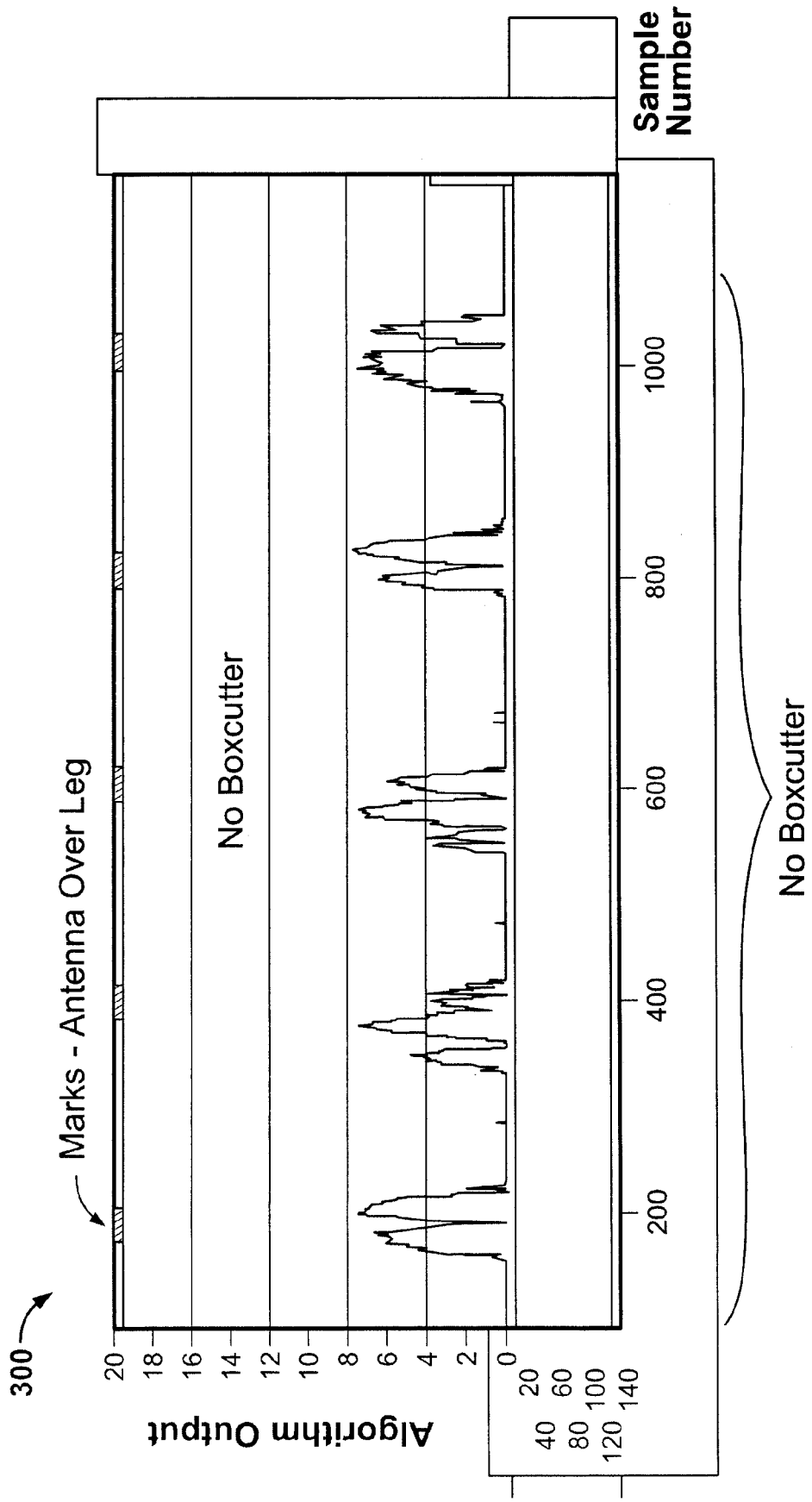
FIGS. 3A and 3B are signals produced by the system of FIG. 1.
Figure 3B:
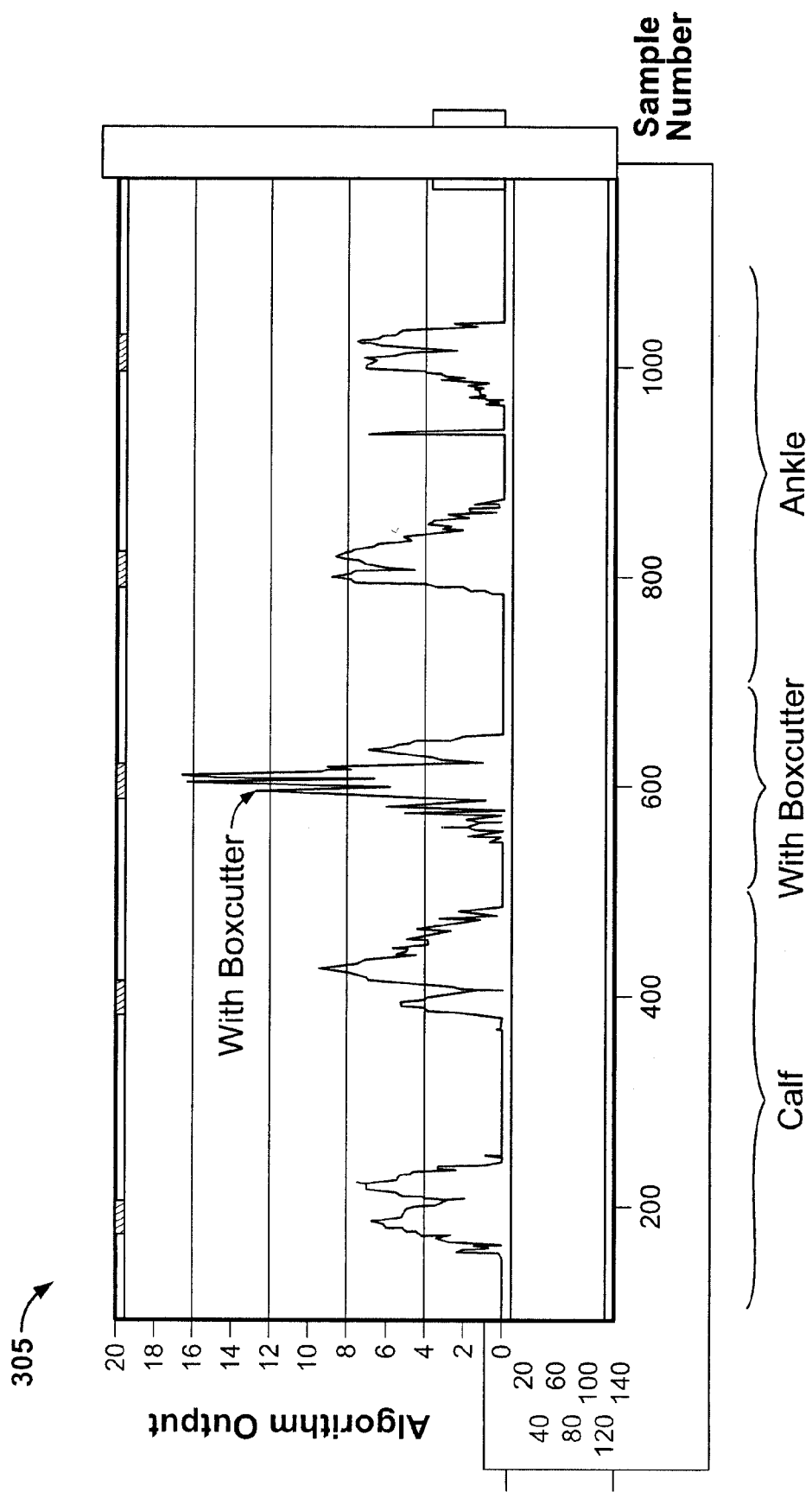
Figure 3C:
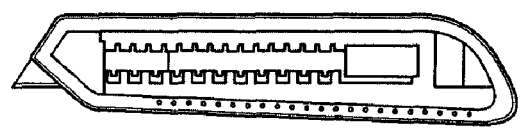
FIG. 3C is an illustration of a boxcutter detected by the system of FIG. 1.
Figure 3D:
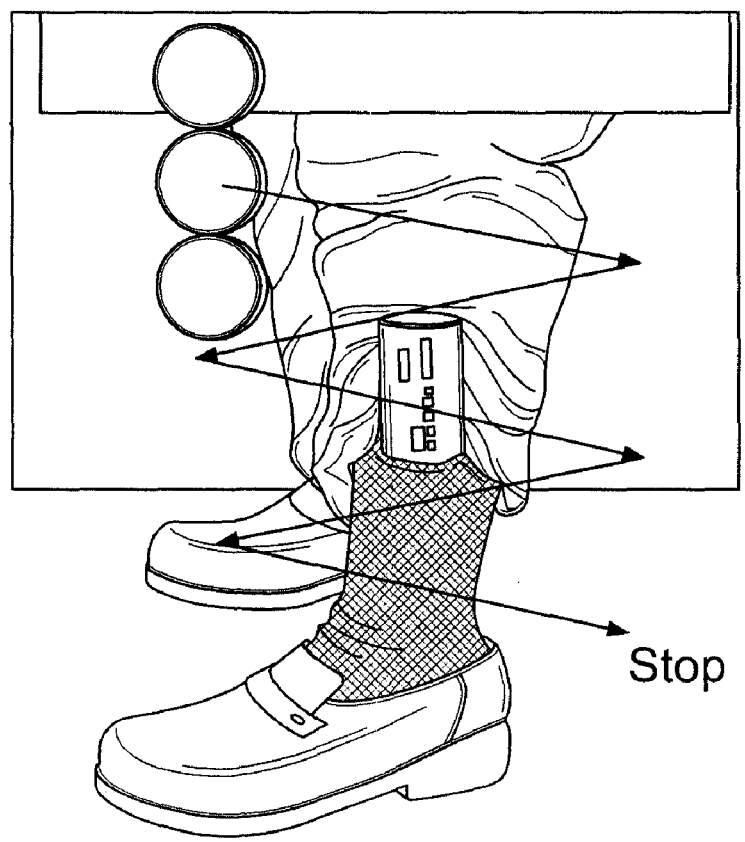
FIG. 3D is an illustration of the boxcutter of FIG. 3C when concealed in a person's clothing.

FIG. 2. illustrates signals produced by the system of FIG. 1 in response to concealed explosives. In particular, FIG. 2 illustrates an amplitude response signal 200 and a time delay signal 205 produced in response to a body 210 that includes an explosive 215 positioned under a clothing layer 220. As shown, both of the signals 200 and 205 include significant level changes in response to the explosive 215.

The reflection from explosives differs from that of the body based on the material dielectric properties. The signal passes through the explosives, reflects off the body, and passes back through the explosives. As shown, the portion of the signal that encounters the explosive is attenuated and time delayed relative to the reflection from the body alone.

FIG. 3 illustrates a signal 300 produced when a person is carrying a concealed boxcutter relative to a signal 305 produced when the person is not carrying a concealed boxcutter.

RF energy interacts with the body depending on frequency: the body absorbs from 30 to 300 MHz, partially absorbs from 300 MHz to 6 GHz, partially or diffusely reflects from 6 GHz to 15 GHz, and highly/specularly reflects at >15 GHz. Previous attempts using frequencies in the highly-reflective region Ka-band (27 to 33 GHz) produced specular reflection images, which made processing to detect the concealed objects difficult. Ku-band (12 to 18 GHz) studies produced slightly better results but straddled the transition from diffuse to specular reflection at 15 GHz.

The techniques may employ the absorption/reflection transition frequency region from 1.5 to 10 GHz. In this region, specific frequencies that maintain high dielectric differences between explosives and the body surface coexist with diffuse reflection from the skin and shallow body depths. This maintains radar cross section or reflection of the target without spoofing the detection process through specular reflection above 12 GHz and without driving the radar cross section to unacceptably low levels below 1 GHz.

In the region from 1.5 to 10 GHz, the explosives dielectric is near 3, while the body covers ranges of 5 for fat, 10 for bone, 40 for skin, and 50 for muscle. This compares well with the mine detection problem, where the explosives dielectric near 3 was embedded in dielectrics between 4 for sand and 20 for wet loam. The clothing dielectric is near 1.1 (with air at 1.0) and therefore provides no significant reflection or effect on the RF energy. The higher dielectric is behind the target, and there is typically much greater difference between the explosive dielectric and the body (for example, explosive to sand is a difference of 1; explosive to skin is a difference of 37).

Mine detection equipment transmits 10 milliwatts and yet enough of a signal penetrates soils that have high attenuation characteristics to achieve excellent performance. Measurements will be made to determine the minimum possible transmitted signal strength to achieve scanner performance through clothing.

Allowable general population/uncontrolled exposure sets the toughest limit on exposure to RF radiation. At the frequencies of interests, the allowable density is 1 mw/cm2 (FCC) for 30 minutes averaging or about $\frac{1}{5}$ to $\frac{1}{10}$ of controlled exposure limits (IEEE and OSHA) for 6 minutes averaging time. At the surface of the transmitter, a density of 0.1 mW/cm2 is anticipated. Exposure through the portal is for less than 10 seconds or about $\frac{1}{200}$ the allowed time period; this combined with the $\frac{1}{10}$ lower maximum energy density yields a very safe $\frac{1}{2000}$ exposure margin. (Note: for cell phones 600 mW is allowed; one could place his head against a transmitter at maximum power of 10 mW and still be $\frac{1}{60}$ of this criteria as well.) The proposed portal system is also well below the specific absorption rate (SAR) limit of 0.4 W/kg. Even if somehow an individual absorbed the RF energy from all 40 transmitters employed in one implementation of a portal-based detection system simultaneously, which is physically impossible, the total would be 0.008 W/kg for a typical 50 Kg individual. This is 50 times less than required; typical exposure to the two corner set of 20 transmitters would be 100 times less.

The walk-through portal scanner of FIG. 1 provides a multi-beam, whole body, low-resolution surface reflectivity imager. As the person walks through the portal scanner, the beams scan first the left side of the body, then the front of the body, then the back of the body, and finally the right side of the body. The actual beam spot size is 5 cm in diameter, and no distance/depth resolution is processed by the algorithms. Thus, no surface contour image is provided, only the surface reflectivity is measured.

The vertical array of beams scans horizontally and vertically. The array of beams scan only a small vertical angle. Together with the horizontal scanning of the array, the surface reflectivity of the person for the left and right sides and the front and back is collected. A flat two-dimensional display is then created of the reflectivity measurements.

The RF models that have been developed, updated, and correlated with mine radar background and target characteristics, are extended to the aviation security scenarios through use of the described radar system. The models include target cross-section, SNR, and algorithm receiver operating characteristics (ROC) curves.

Radar data is collected against targets (recent examples being the buried mines) and segregated into algorithm training and testing groups. Typically, enough data is collected to separate the groups wholly (to demonstrate the required Pd and FAR at 90% confidence, for example). Alternatively, so-called 'leave-one-out' testing may be performed to achieve nearly the same statistical significance with half the data. Training and testing on the same data (Train A/Test A) only provides a lower bound on the Bayes error for the population distribution. Train A/Test B (or equivalently, leave-one-out training/testing) provides the upper bound on the Bayes error that is practically a more useful predictor of system performance.

Figure 4A:
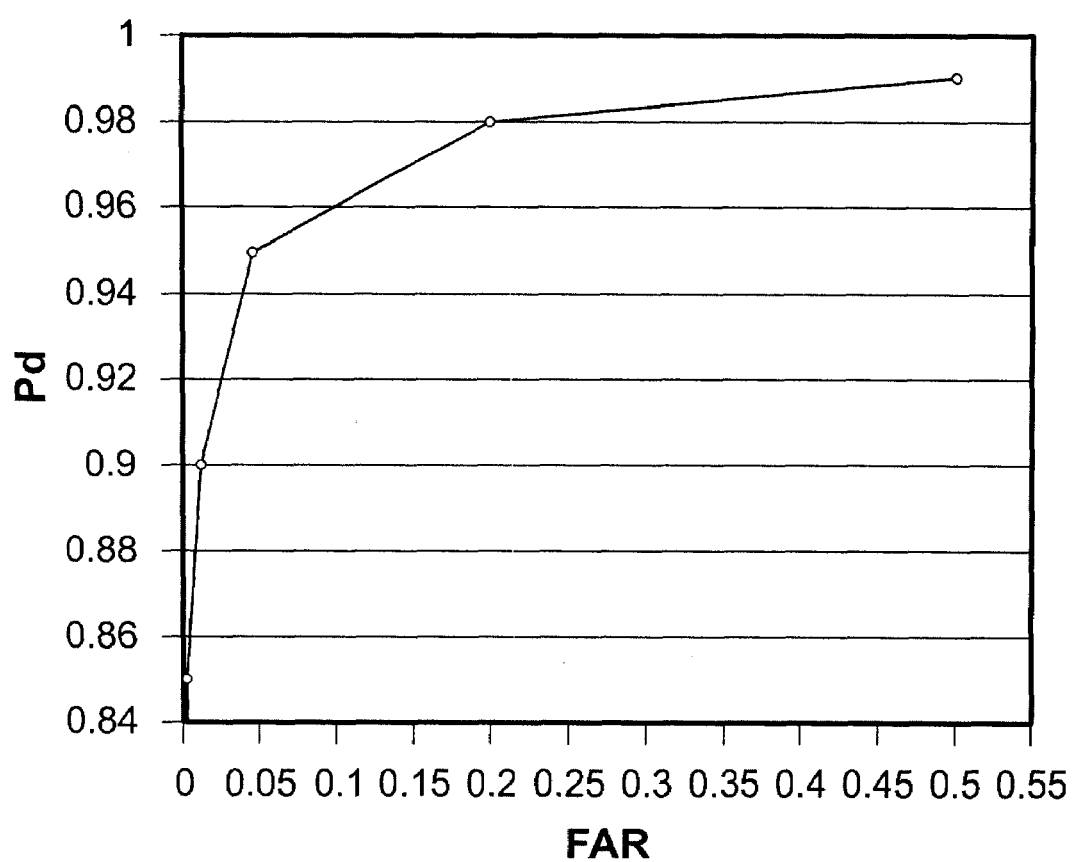
FIGS. 4A and 4B are graphs illustrating performance of the system of FIG. 1.
Figure 4B:
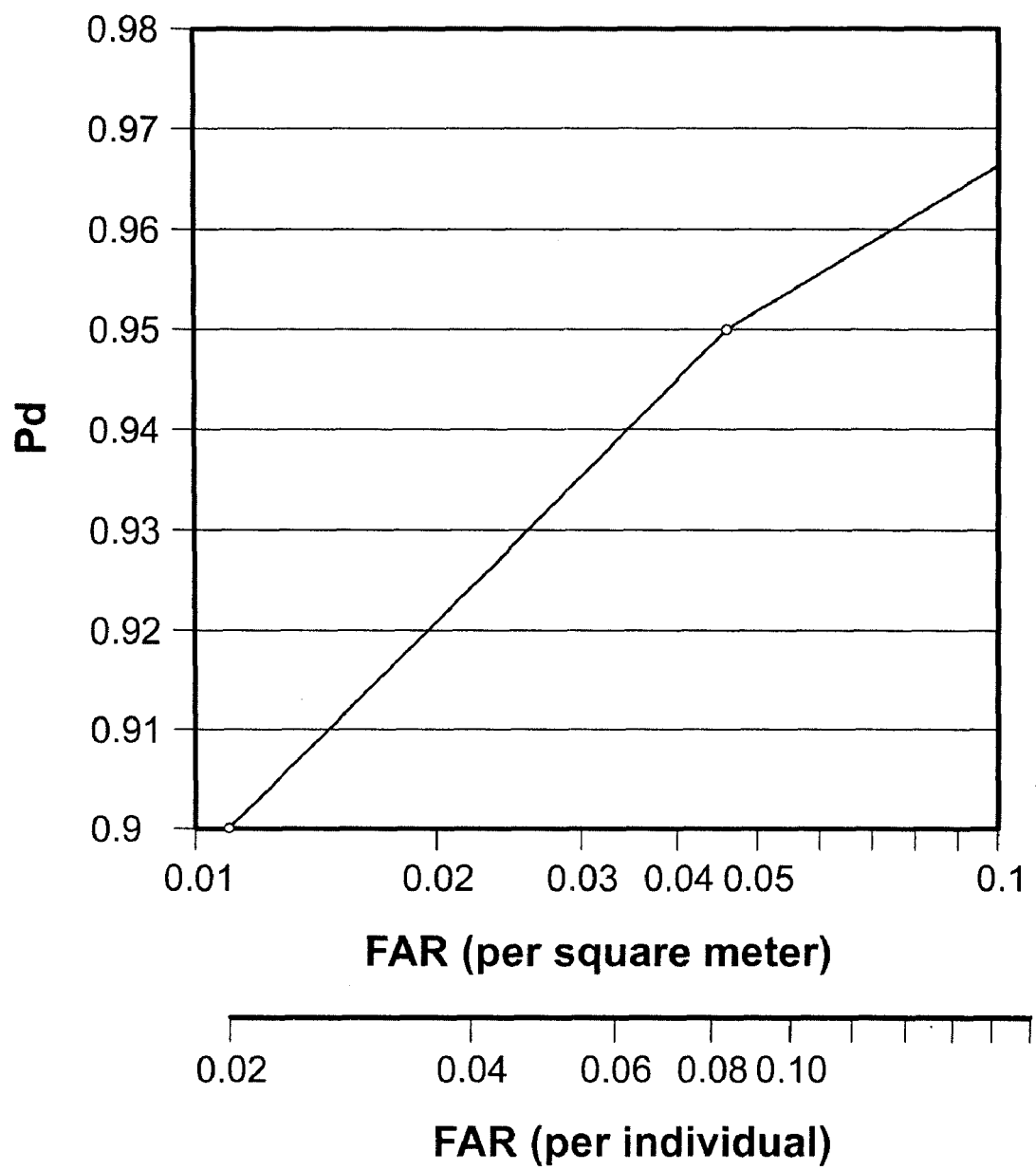

System performance may be defined in view of Pd versus FAR. Both Pd and FAR are evaluated together, preferably using ROC curve methodology including confidence intervals. There are two measures of FAR, per individual and per group. For the former case, using 1.75 m$^2$ for surface area, if the system performance is similar to the mine detection performance, then scaling this performance along the ROC curve yields a 2% FAR per individual at the required 90% Pd. Only 1 in 50 individuals would have to be rescanned using a handheld device, assuming individual and group statistics are similar. An example of the tradeoff between Pd and individual FAR is shown in FIG. 4.

For the aviation security problem, significantly better performance (near 100% Pd and near 0 FAR) is expected because of the relatively controlled/benign environmental factors involved, versus the unconstrained, outdoor, small mine detection problem. Specifically, the mine detection technology was designed and successfully tested against three types of backgrounds: gravel, grass, and bare soil. These terrains included, for example, buried roots and rocks. The targets included a 6 cm circular plastic encased explosive that is significantly smaller than a baseline 10 cm by 7.6 cm 'wallet' target.

Use of radar technology permits the system to provide real-time alerts. Typically, a real-time alert is in the form of an audio signal. In some implementations, a two-dimensional offline image is provided to indicate the on-body position of detected objects. For example, icons representing detected objects may be presented on a notional/universal wire-frame body to indicate the location and size of the detected objects. Typically, no actual imagery of either the object itself or the subject body will be created or displayed. The two-dimensional plot includes icon and text overlays that indicate the object position and size with absolutely no operator training or interpretation required.

Detection of concealed metallic or plastic objects poses a significant challenge for the radar hardware. Current short pulse or video penetrating radar systems are sensitivity limited by problems with extraneous signal interference competing with the desired signal. The result is an unrecognizable signal, and even after processing and display, the data is unusable. The signal interference arises in most cases due to mismatches in components internal to the radar system, not from external sources. Some of the specifics are: (1) antenna mismatch due to bandwidth limitations and dispersion; (2) transmitter waveform sidelobes; (3) multiple transmitter/receiver/antenna reflections due to mismatch impedances; and (4) non-uniform bandwidth, no absolute control of transmitter. The described frequency stepped radar system design eliminates the problems of the current 'short-pulse' radar systems to allow for an increase in measurement capability. Bandwidth control improves detection of small, non-metallic objects and plastic objects with small cross sections, and a reduction in interference improves sensitivity and signal clarity.

The frequency-stepped radar permits operation at an RF duty factor approaching unity, to remove the short-pulse radar requirement that the RF equipment (transmitter, antenna, and receiver) be instantaneously broadband. It also achieves a fully coherent radar capability while retaining (and expanding) the achievable high-range resolution capability. The significance of the high RF duty factor is that the thermal-noise-limited detection sensitivity of the radar can be achieved using readily available components. In fact, with the high-RF, duty-factor-stepped frequency waveform, the sensitivity limit is dictated by parameters related to the environment in which objects are located. The frequency-stepped radar is fully coherent which allows for compensation of hardware amplitude and phase (dispersion) errors over the operating RF band.

A bi-static system (separate transmit and receive antennas) is used with appropriate calibration and signal processing. The critical technology advantage for the described system proposed lies in the bandwidth control, the resultant sensitivity increase and the antenna match that can be achieved given the frequency bandwidth that must be covered and the various conditions through which the antenna must propagate energy. The overall radar specifications for one implementation are provided below in Table 1.

TABLE 1

Penetrating Radar Parameters

| | |
|---|---|
| Radar type | Frequency stepped |
| Receiver sensitivity | −110 dBm |
| Antennas | 3-inch cavity backed spirals |
| Frequency band | 1.5 to 10 GHz |
| Power output transmit | <1 milliwatt |
| Power | 24 Vdc, 4 amps |
| Electronis/system weight | 4 kg |
| Antennas weight | 1 kg |

The system employs a derivative, penetrating radar system based on mine detection hardware and software. To the extent available, off-the-shelf electronic components are used to extend/shift current frequency-stepped RF module performance from 1 to 3 GHz to cover the range from 1.5 to 10 GHz.

Figure 5:
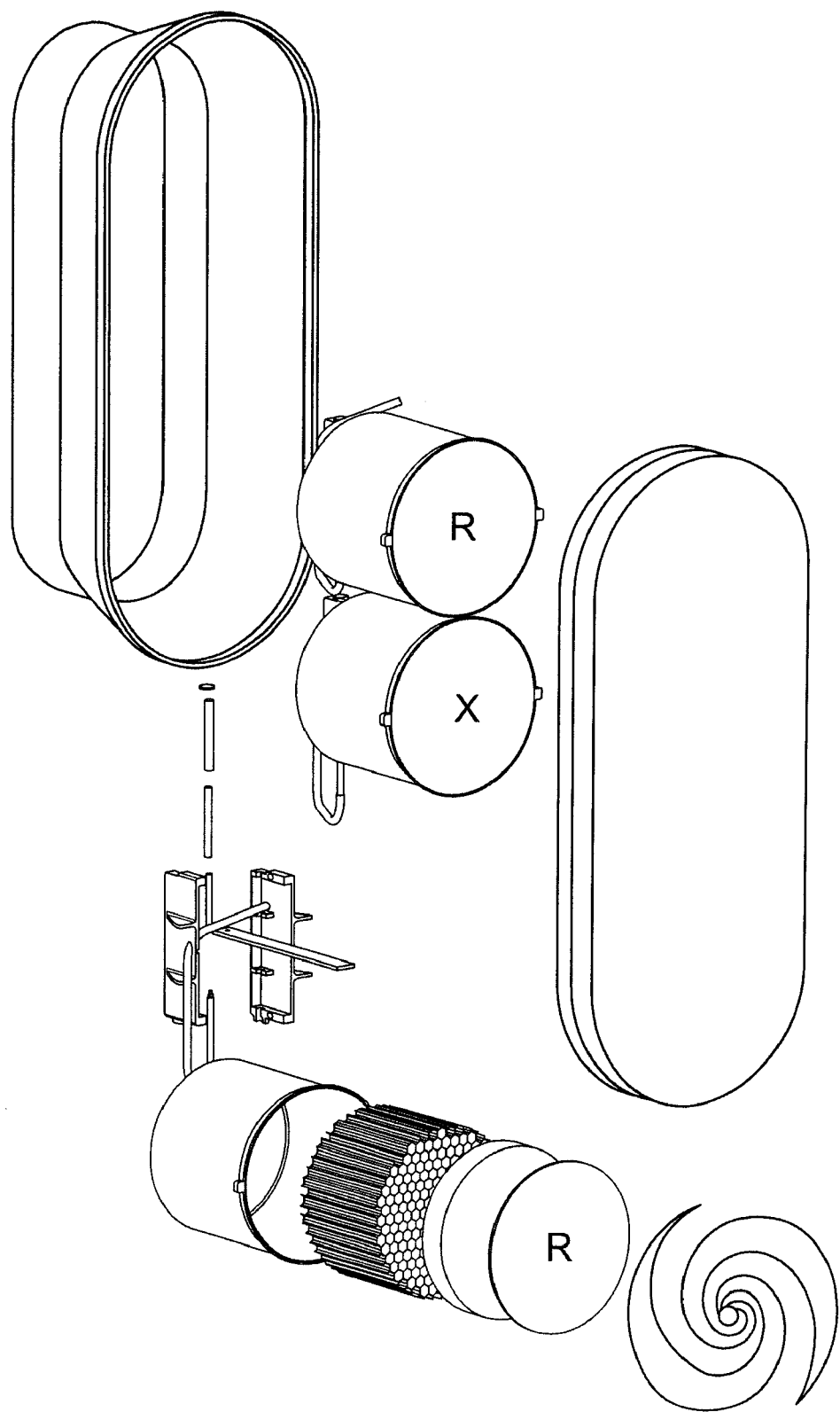
FIG. 5 is a perspective view of an antenna of the system of FIG. 1.
Figure 6:
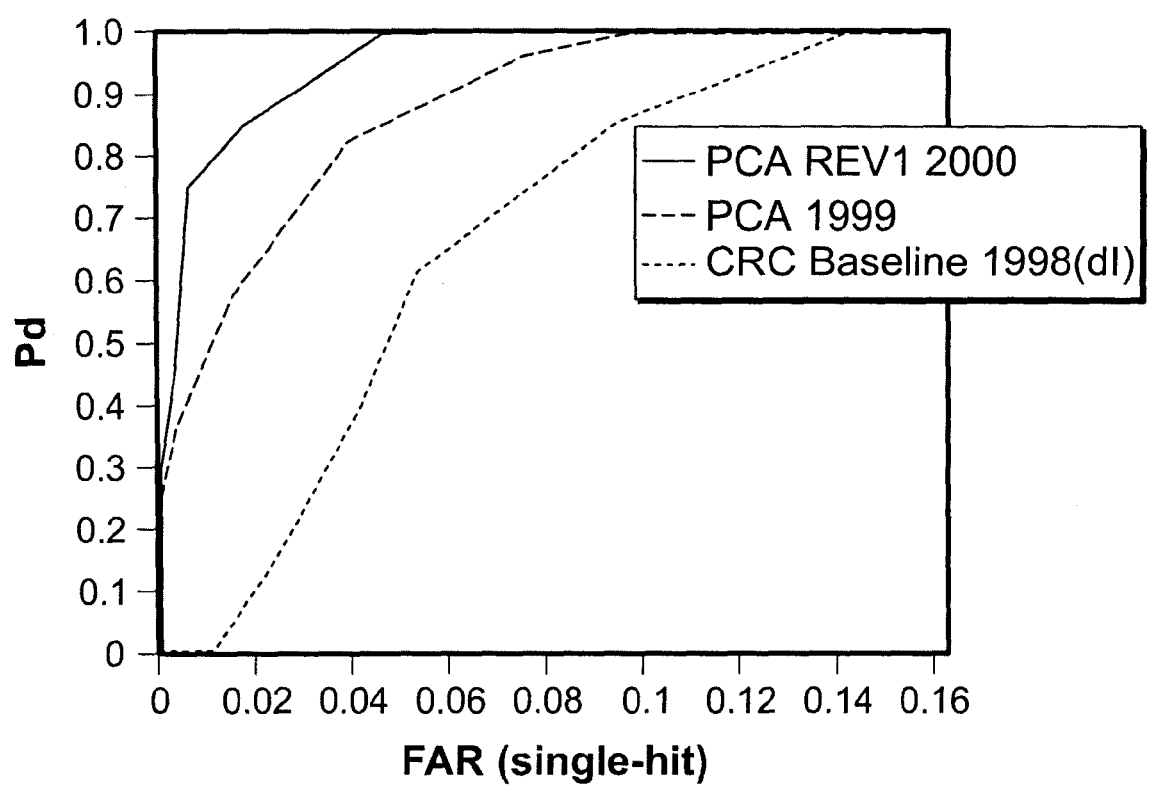
FIG. 6 is a graph used in real-time audio detection by the system of FIG. 1.

FIG. 5 illustrates an antenna design employed in one implementation of the system of FIG. 1. From the viewpoint of size reduction, the spiral antenna is the most attractive. For an antenna to be an efficient radiator, it must normally have a dimension of at least one-half wavelength. The spiral radiates efficiently when it has an outer circumference of at least one wavelength. This means it needs a maximum diameter of about one-third wavelength. The upper frequency limit for efficient spiral radiation is set by the size of the feed point attachments, and the lower frequency limit is set by the outer diameter of the spiral structure. Within these limits, the spiral radiates efficiently in a frequency-independent manner. The input impedance and the radiation patterns will vary little over this frequency range. With any spiral structure, an upper frequency of 10 gigahertz presents no problem.

The spiral antenna is constructed by etching the pattern on a printed circuit board. A planar, printed circuit, spiral antenna radiates perpendicularly to the plane of the spiral. The spiral itself is located at the end of a cylindrical metal cavity (the cavity back) to provide isolation from neighboring elements and electronics. Typically, an absorber is used on the top-side of the spiral inside the cavity to make sure the element responds only downward. Separate transmit and receive antennas are used to simplify the electronics, provide spatial separation and reduce very shallow reflections.

Suitable processing hardware includes a PowerPC 750 processor running at 350 MHz on a PMC mezzanine form factor. The PowerPC 750 is ideally suited for portable applications due to the small die size and low power consumption of less than 4 Watts and its low cost.

The described systems and techniques promise to provide low cost, ease of use, and higher performance (better detection and lower false alarm rate). A low-cost, user-friendly radar system for difficult concealed object detection employs a comprehensive antenna and RF module design, sophisticated concealed/buried target detection algorithms. Data collected against different targets and in different conditions, together with adaptive/advanced algorithms, will enable prediction and (through testing), validation of performance for a range of potential operating frequencies.

We claim:

1. An object detection system for detecting objects carried by a person, the system comprising:
   radar transceivers that are each configured and positioned to direct a radar signal at a person and to detect a portion of the radar signal reflected by the person; and
   a processor connected to the radar transceivers and operable to:
   process the portions of the radar signals detected by the radar transceivers to conduct a test to determine whether the person is carrying an object to be detected, in which a first characteristic of a first dielectric constant associated with the person is determined from the portions of the radar signals detected by the radar transceivers and a second characteristic of a second dielectric constant associated with the object to be detected is determined from the portions of the radar signals detected by the radar transceivers, and analyze the portions of the radar signals in comparison with pre-determined types of items, and, based on the comparison, to output an indication of a detected object.

2. The system of claim 1 wherein a radar transceiver is operable to output the transmitted radar frequency signal throughout a frequency range of approximately 1.5 to 10 GHz.

3. The system of claim 1 wherein a dielectric constant of the detected object is less than 5.

4. The system of claim 1 wherein the detected object comprises a plastic or paper material.

5. The system of claim 1 wherein the detected object comprises a metallic object.

6. The system of claim 1 wherein the processor is operable to implement a frequency-stepped radar transmission scheme.

7. The system of claim 1 wherein:
the radar transceivers are vertically stacked within each of a plurality of posts, and
the plurality of posts are arranged around a central point.

8. The system of claim 7 wherein the radar transceivers include a vertical beam array and a horizontal beam array for scanning the transmitted radar frequency signal in vertical and horizontal directions about the central point.

9. The system of claim 8 wherein the processor is operable to make a determination that the detected object is in the vicinity of the central point.

10. The system of claim 9 wherein a height of the posts and scanning angles of the detectors selected to provide a whole-body scan of the person located in the vicinity of the central point.

11. The system of claim 10 wherein the processor is operable to determine a location of the detected object relative to the person.

12. The system of claim 11 wherein the processor is operable to determine reflectivity measurements associated with a surface reflectivity of the person and clothing of the person.

13. The system of claim 12 wherein a two-dimensional display is created based on the reflectivity measurements.

14. The system of claim 1 wherein the processor is operable to determine whether the object to be detected is being concealed by the person.

15. The system of claim 1 wherein the processor is operable to determine whether the object to be detected is in contact with the person.

* * * * *